United States Patent
Council et al.

(10) Patent No.: US 6,259,779 B1
(45) Date of Patent: Jul. 10, 2001

(54) METHOD AND APPARATUS FOR GENERATING AND/OR UPDATING AN AUTHORIZATION LIST ASSOCIATED WITH A TELEPHONE SUBSCRIBER

(76) Inventors: Michael O. Council, 186 Hurt Dr., Cordele, GA (US) 31015; Daniel J. Santos, 1005 Riverbend Club Dr., Atlanta, GA (US) 30339

( * ) Notice: Subject to any disclaimer, the term of this patent is extended or adjusted under 35 U.S.C. 154(b) by 0 days.

(21) Appl. No.: 09/200,148

(22) Filed: Nov. 25, 1998

Related U.S. Application Data

(63) Continuation-in-part of application No. 09/141,143, filed on Aug. 27, 1998.

(51) Int. Cl.[7] .................................................. H04M 15/00
(52) U.S. Cl. .......................... 379/121; 379/126; 379/120; 379/127; 379/114
(58) Field of Search .................................. 379/127, 142, 379/130, 114, 67.1, 88.19, 88.2, 143, 187, 199, 197, 115, 112, 126, 121, 120; 455/405, 406

(56) References Cited

U.S. PATENT DOCUMENTS

| | | | |
|---|---|---|---|
| 5,473,671 | * | 12/1995 | Partridge, III ........................ 379/142 |
| 5,550,904 | * | 8/1996 | Andruska et al. .................... 379/127 |
| 5,625,680 | * | 4/1997 | Foladare et al. ...................... 379/127 |
| 5,651,053 | * | 7/1997 | Mitchell ................................ 379/142 |
| 5,832,072 | * | 11/1998 | Rozenblit ............................. 379/142 |
| 5,883,942 | * | 3/1999 | Lim et al. ............................. 379/142 |

\* cited by examiner

*Primary Examiner*—Curtis Kuntz
*Assistant Examiner*—Rexford N. Barnie

(57) ABSTRACT

The present invention provides a method and apparatus for generating and updating an authorization list associated with a subscriber which may be used to determine whether a party initiating a telephone call is on a list of parties authorized by the subscriber. If the calling party is not on the list of authorized parties, a fee may be charged to the calling party in return for being connected to the subscriber. Preferably, the present invention is implemented at the subscriber's central office, i.e., at the central office which services the subscriber. In accordance with common-channel signaling, commonly referred to as signaling system 7 (SS7), the calling party's telephone number and identity are received in the call signaling data transmitted to the central office which services the subscriber. Processing equipment located at the subscriber's central office is programmed to compare the calling party's identity and/or telephone number with a list of authorized identities and/or telephone numbers associated with the subscriber to determine whether the calling party is an authorized party. The present invention provides a method and apparatus which enables the subscriber to easily generate and/or update the subscriber's authorization list. The present invention also enables the subscriber to cause a fee that was previously charged to a calling party who called the subscriber and who was not listed on the subscriber's authorization list to be deleted.

4 Claims, 7 Drawing Sheets

METHOD AND APPARATUS FOR GENERATING AND/OR UPDATING AN AUTHORIZATION LIST ASSOCIATED WITH A TELEPHONE SUBSCRIBER

CROSS REFERENCE TO RELATED APPLICATIONS

The present application is a continuation-in-part application under 37 CFR §1.53(b) of application Ser. No. 09/141, 143, entitled "A METHOD AND APPARATUS FOR CHARGING A FEE TO A PARTY INITIATING A TELEPHONE CALL WHEN THE PARTY IS NOT ON AN AUTHORIZATION LIST ASSOCIATED WITH THE SUBSCRIBER", filed Aug. 27, 1998.

This application contains subject matter that is similar to subject matter contained in related copending U.S. utility patent application entitled "A Method and Apparatus for Billing a Fee to a Party Initiating an Electronic Mail Communication" filed on Sep. 2, 1998 and accorded Ser. No. 09/145,710; and A Method and Application for Determining Whether a Party Placing a Call is to be Charged a Fee in Return for being Connected to the Called Party" filed on Feb. 10, 1999 and accorded Ser. No. 09/247,371, which are entirely incorporated herein by reference.

TECHNICAL FIELD OF THE INVENTION

The present invention relates to communications and, more particularly, to a method and apparatus for generating and/or updating a list of authorized callers associated with a telephone subscriber. The present invention also relates to a method and apparatus for updating a billing record associated with the list.

BACKGROUND OF THE INVENTION

Many businesses utilize telemarketing as a means of soliciting customers in order to promote or sell the company's products and/or services. Telephone solicitations have become such an annoyance to many telephone subscribers that at least one State, namely Georgia, has enacted legislation intended to prevent companies or individuals from contacting telephone subscribers who have been placed on a list, referred to as the "No Call List", maintained by the Georgia Public Service Department. A fee is charged to any telephone subscriber wanting to be registered on the list. Telephone solicitors are required to obtain the list and quarterly updates of registrants to the list and to pay an annual fee. If a telephone solicitor places a telephone call to anyone on the list, the telephone solicitor can be subjected to a fine.

One of the disadvantages of using the "No Call List" is that subscribers must pay a fee to be placed on the list in order to prevent telemarketers from contacting them. Currently, this fee is $5.00 per telephone number. Therefore, a financial burden is placed on the telephone subscriber in order for the telephone subscriber to avoid being bothered by unwanted telephone calls.

A service known as Caller-ID is now available which allows a party receiving a telephone call to visually review the telephone number and/or the identity of the calling party before deciding whether to accept the telephone call. However, Caller-ID has several disadvantages. First of all, when the subscriber receives a telephone call, the subscriber must visually review the caller's identity and/or the telephone number on the display of the Caller-ID device to determine whether he or she wishes to accept the telephone call. Therefore, the telephone rings regardless of whether or not the subscriber is interested in accepting the call, which interrupts the subscriber. Although the Caller-ID service does provide the subscriber with the option of blocking telephone calls, it does not provide for billing the calling party a fee in order to connect the calling part with the subscriber.

Secondly, many telephone calls show up on the Caller-ID display as "unknown" or "private" numbers, thereby preventing the subscriber from ascertaining the telephone number and/or identity of the calling party. Therefore, the subscriber often feels compelled to accept the call when this message is displayed even though the subscriber does not know the telephone number and/or the identity of the calling party.

Recently, a service known as "Privacy Manager", developed by Ameritech Corporation, solves some of the shortcomings of Caller-ID related to "unknown" and "private" numbers. Privacy Manager implements software which intercepts calls from "unknown", "private", "unavailable", "out-of-area" and "blocked" numbers which are directed to persons subscribing to the "Privacy Manager" service. The software then causes the caller to be asked to record his or her name and then provides that information to the subscriber. The subscriber then decides whether he or she wishes to accept the call. Therefore, the caller is not connected to the subscriber until the subscriber has indicated that he or she will accept the call. If the caller does not provide the caller's name, the software causes the call to be disconnected.

One of the disadvantages of Privacy Manager is that the telephone rings and the subscriber must then decide whether to accept the call. Therefore, even if the subscriber decides not to accept the call, the subscriber has been inconvenienced by the call Accordingly, a need exists for a method and apparatus that allows a subscriber to authorize certain callers to be connected to the subscriber and, on the other hand, which allows a subscriber to effectively block calls from unauthorized parties and/or selectively accept the unauthorized calls in exchange for some pecuniary benefit charged to the party initiating the call. In this way, a financial burden is not placed on the subscriber, but rather, is placed on the unauthorized caller. Furthermore, if the subscriber decides to accept an unauthorized call, the subscriber can, depending on how the fees are allocated, receive a portion of the fee charged to the telemarketer in return for being connected to the subscriber.

SUMMARY OF THE INVENTION

The present invention provides a method and apparatus for allowing a telephone subscriber to selectively control which parties are allowed to be connected to the subscriber's telephone line when the parties place calls directed to the subscriber's telephone number. Preferably, the present invention is an optional service which a telephone subscriber has the option of requesting to be placed on his or her line by the local telephone company. In accordance with the present invention, the subscriber causes an authorization list to be generated which lists persons or parties who are allowed to be connected to the subscriber's telephone line.

When a caller places a telephone call to the subscriber's telephone number, a determination is made within the telephone network as to whether or not the caller is an authorized caller, i.e., as to whether or not the caller is listed on the authorization list. If the caller is an authorized caller, the caller is connected to the subscriber in the typical manner to allow the caller and the subscriber to communicate with each other. If the calling party is not on the list of authorized parties, preferably a fee is charged to the calling party in return for being connected to the subscriber.

The authorization list may be generated in a plurality of manners. In accordance with a first embodiment of the present invention, the subscriber may simply call the local telephone company and orally provide the local telephone company with a list of authorized callers. Preferably, the list is maintained by the subscriber's local telephone company because the method and apparatus of the present invention are preferably implemented at the central office, which is typically owned and operated by the local telephone companies. However, those skilled in the art will understand that the present invention is not limited with respect to the location in the telephone network at which the present invention is implemented and thus is not limited with respect to the entity which maintains the authorization list. For example, the authorization list could be maintained by a long distance carrier.

In accordance with the first embodiment of the present invention, whenever the list is to be updated, e.g., whenever a telephone number is to be removed or added to the list, the subscriber simply calls the local telephone company (or other entity maintaining the list) and orally updates the list. A person at the local telephone company simply edits the list in accordance with the subscriber's requests. Also, if a caller was charged in return for being connected to the subscriber and the subscriber now wants to add the caller to the authorization list and/or delete the charge, the subscriber can orally request that the caller be added to the list and/or that the charge to the caller be deleted.

In accordance with the preferred embodiment of the present invention, the processes of generating and updating the list are automated. In accordance with this embodiment of the present invention, a particular series of digits on the telephone keypad are assigned which indicate to the central office that a subscriber wants to generate an authorization list. When the central office detects the off-hook signal indicating that the subscriber's telephone is "off-hook", the central office waits for the subscriber to enter digits on the keypad. When the central office receives the digits, the digits are analyzed. When the central office determines that the digits entered by the subscriber are the digits assigned to the task of generating the authorization list, the central office waits for the subscriber to enter the telephone numbers to be placed in the list. Once the subscriber has entered all of the telephone numbers to be placed in the list, the list is saved along with an indication of the subscriber with whom the list is associated.

In accordance with this preferred embodiment, the central office may assist the subscriber in using the automated list generation feature by playing back one or more prerecorded announcements to the subscriber which assist the subscriber in entering the information and/or modifying information already entered. In this case, a prerecorded announcement could tell the subscriber to press a particular key on the keypad after each or after all of the telephone numbers to be placed on the list have been entered. When the central office detects this particular digit or series of digits, the central office will react accordingly.

In accordance with this preferred embodiment of the present invention, when a particular digit or series of digits (i.e., a code) on the keypad is depressed, such as, for example, "*72", this indicates to the central office that a previously generated list associated with the subscriber's telephone number is to be updated. When the central office detects the occurrence of this code, the central office retrieves the subscriber's list and modifies the list in accordance with the digits entered by the subscriber. Preferably, this aspect of the present invention can also be used to enable a previously unauthorized caller who has been charged a fee in returned for being connected to the subscriber to be added to the list and allows the subscriber to cause the charge to be deleted.

Preferably, immediately after the subscriber has finished speaking or otherwise communicating with the unauthorized caller that the subscriber wishes to add to the list, the subscriber hangs up the telephone causing it to go "on-hook" and then immediately picks up the telephone causing it to go "off-hook". The subscriber then enters a particular code, such as, for example, "*63". This code indicates to the central office that the last caller that was connected with the subscriber is to be added to the subscriber's authorization list and/or that the fee that was charged to the caller is to be deleted from the billing records. The central office keeps track of the last call that was connected to the subscriber's line. When a telephone goes "off-hook", the central office knows which telephone number corresponds to the telephone that is "off-hook". Therefore, all the subscriber has to do in order for the caller to be added to the list and/or for the charge to be removed is to enter the code, which preferably is common to all subscribers. This feature of the present invention allows the subscriber to easily update the list and to easily delete charges to callers whom the subscriber does not want to be charged.

All or a portion of the fee charged to a caller may be paid to the subscriber or may be applied to the subscriber's telephone service billing account to reduce the subscriber's telephone bill. The present invention is not limited with respect to the manner in which the fee is collected and/or used after the calling party has been charged.

The present invention is also not limited with respect to the location at which the method and/or apparatus of the present invention are located in the telephone network. Preferably, the present invention is implemented at the subscriber's central office, i.e., at the central office which services the subscriber. In accordance with common-channel signaling, commonly referred to as signaling system 7 (SS7), the calling party's telephone number and identity are received in the call signaling data transmitted to the central office which services the subscriber. Many services, such as, for example, caller-ID, are implemented at the subscriber's central office. Therefore, processing equipment is already available at central offices for detecting the calling party's identity and telephone number and for processing this information. Preferably, this processing equipment at the subscriber's central office is programmed in accordance with the present invention to compare the calling party's identity and/or telephone number with a list of authorized identities and/or telephone numbers associated with the subscriber to determine whether the calling party is an authorized party.

Preferably, the service provided by the present invention is optional and can be enabled or disabled at the subscriber's central office depending on whether the subscriber has requested the service. Assuming the subscriber has subscribed to the service, if the calling party is not an authorized party, the processing equipment either automatically charges the calling party a connection fee and connects the calling party with the subscriber. Alternatively, the processing equipment informs the calling party that it is not an authorized party and gives the calling party the option of being disconnected, or of being billed the connection fee and connected to the subscriber. In the later case, if the calling party authorizes the connection fee to be billed, the calling party is then connected to the subscriber. Otherwise, the calling party is disconnected.

These and other features and advantages of the present invention will become apparent from the following description, drawings and claims.

DETAILED DESCRIPTION OF THE INVENTION

Figure 1:
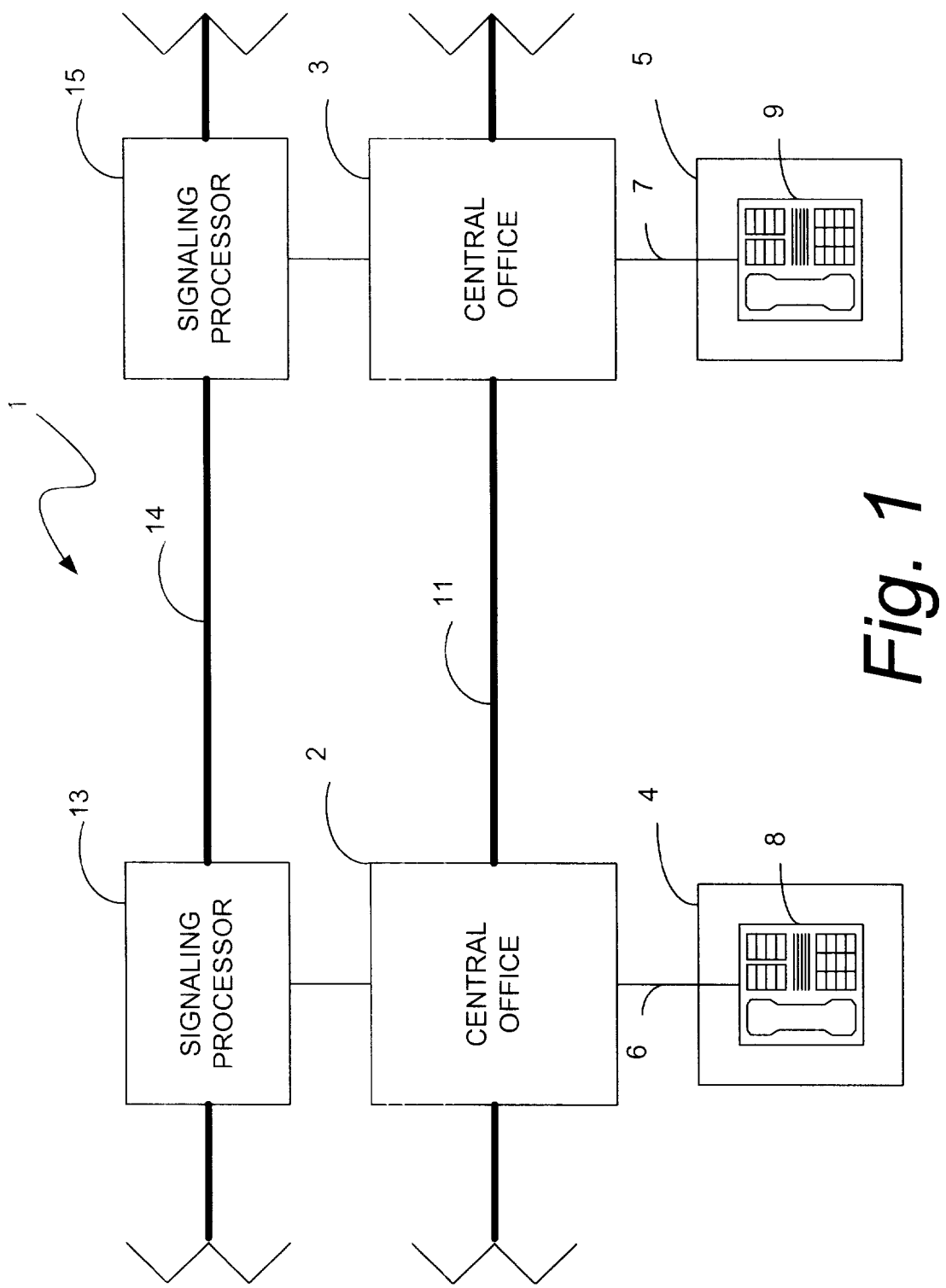
FIG. 1 is a block diagram of a typical telephone network implementing common-channel signaling, commonly referred to as signaling system 7 (SS7).

FIG. 1 illustrates a block diagram of a telephone system 1 in which the method and apparatus of the present invention may be implemented. For ease of illustration, only two customer premises 4 and 5 and the central offices 2 and 3 to which they are connected are shown in FIG. 1. Central offices 2 and 3 provide the switching operations for connecting a calling party located at a customer premises 5 with a subscriber located at another customer premises 4. A twisted, or copper, pair 6 connects the central office 2 to a telephone 8 located at the customer premises 4. The central office 2 is connected to central office 3 via a cable trunk 11. The central office 3 is connected to a telephone 9 located at customer premises 5 via a twisted, or copper, pair 7. Voice information is transmitted over trunk 11 between central offices 2 and 3.

Preferably, call signaling is accomplished in accordance with the common-channel signaling protocol which is well known in the communications industry and which utilizes a separate dedicated data channel to carry signaling information in the form of short packets of data. In accordance with this protocol, the packets of data contain call a signaling information as well as the identification and/or telephone number of the calling party. These packets are transmitted between the signaling processors 13 and 15 via cable trunk 14. The signaling processors 13 and 15 determine the switching of the customer circuits to be performed by switching modules (not shown) located at the central offices 2 and 3 to cause the calling party located at customer premises 5 to ultimately be connected to the subscriber located at customer premises 4.

Figure 2:
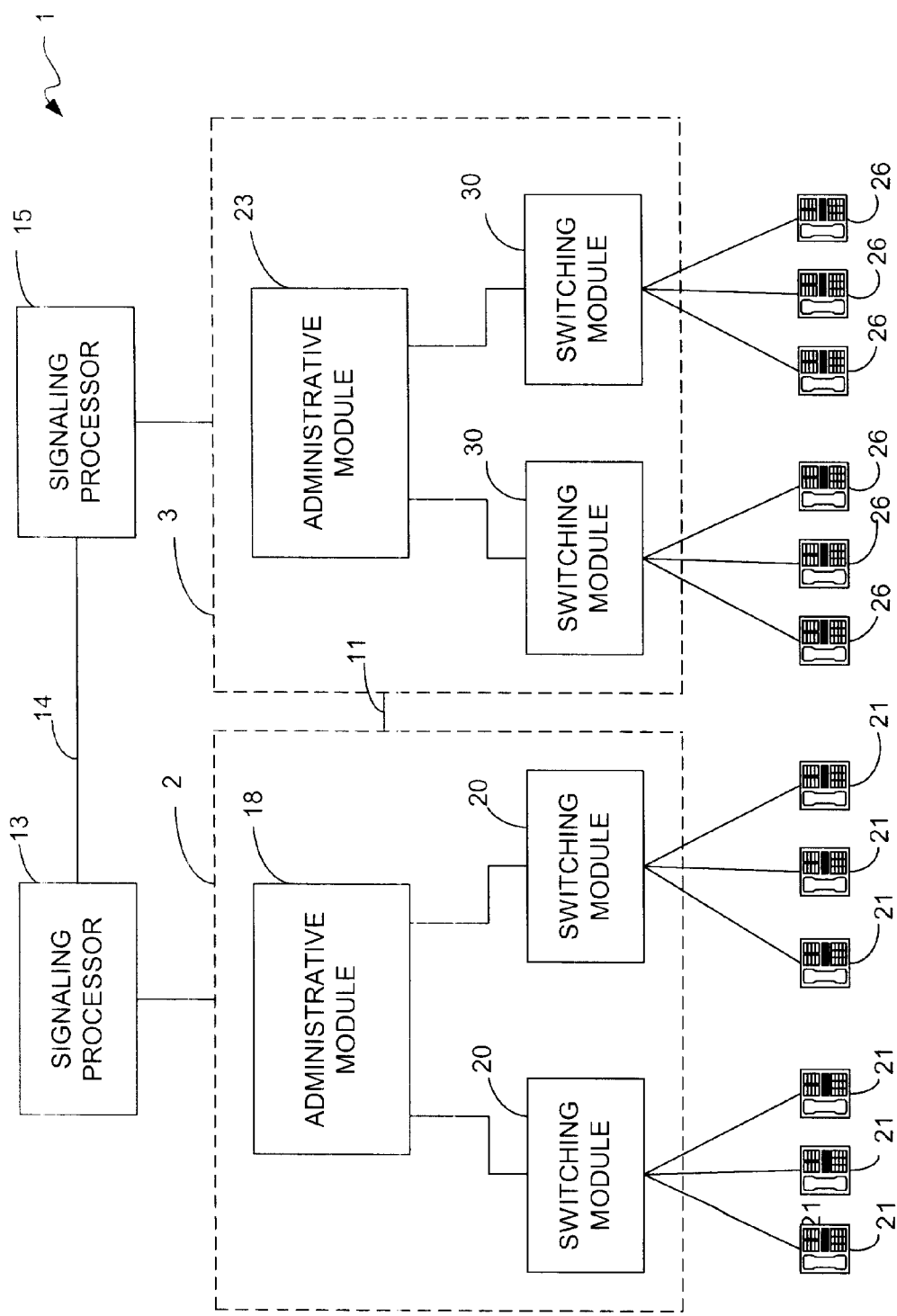
FIG. 2 is a block diagram illustrating the components of the central office shown in FIG. 1.

FIG. 2 is a block diagram which illustrates the central offices 2 and 3 in more detail. Each of the central offices comprise an administrative module and a plurality of switching modules. The functions of these components will be described with respect to central office 2. The administrative module 18 receives the call signaling information from the signaling processor 13 and causes the switching modules 20 to be switched to set up call sessions for telephones 21. The administrative module 18 also handles all billing tasks for the central office 2 and creates billing files that are ultimately dumped to a location designated by the telephone company where they are used to generate customers' bills. The administrative module comprises a computer (not shown) running software for performing all of these tasks. The administrative module 18 also comprises a memory device (not shown) in communication with the computer with for storing any files used by or generated by the computer and any other software needed by the computer for performing all of its tasks.

The switching modules 20 perform the switching of the customer circuits. Preferably, the method of the present invention is implemented in part by the switching modules 20 and in part by the administrative module 18. Each of the switching modules comprises a computer for performing the switching functions. This computer preferably is utilized in accordance with the present invention to determine whether the identity and/or telephone number of the calling party is on a list of parties authorized by the called parties. Each switching module 20 contains a list which corresponds to each of the called parties serviced by that particular switching module. Once this determination is made by the switching module 20, the switching module 20 takes the appropriate action. The administrative module 18 calculates all billing information relating to the fee to be charged to and collected from the calling party.

Figure 3:
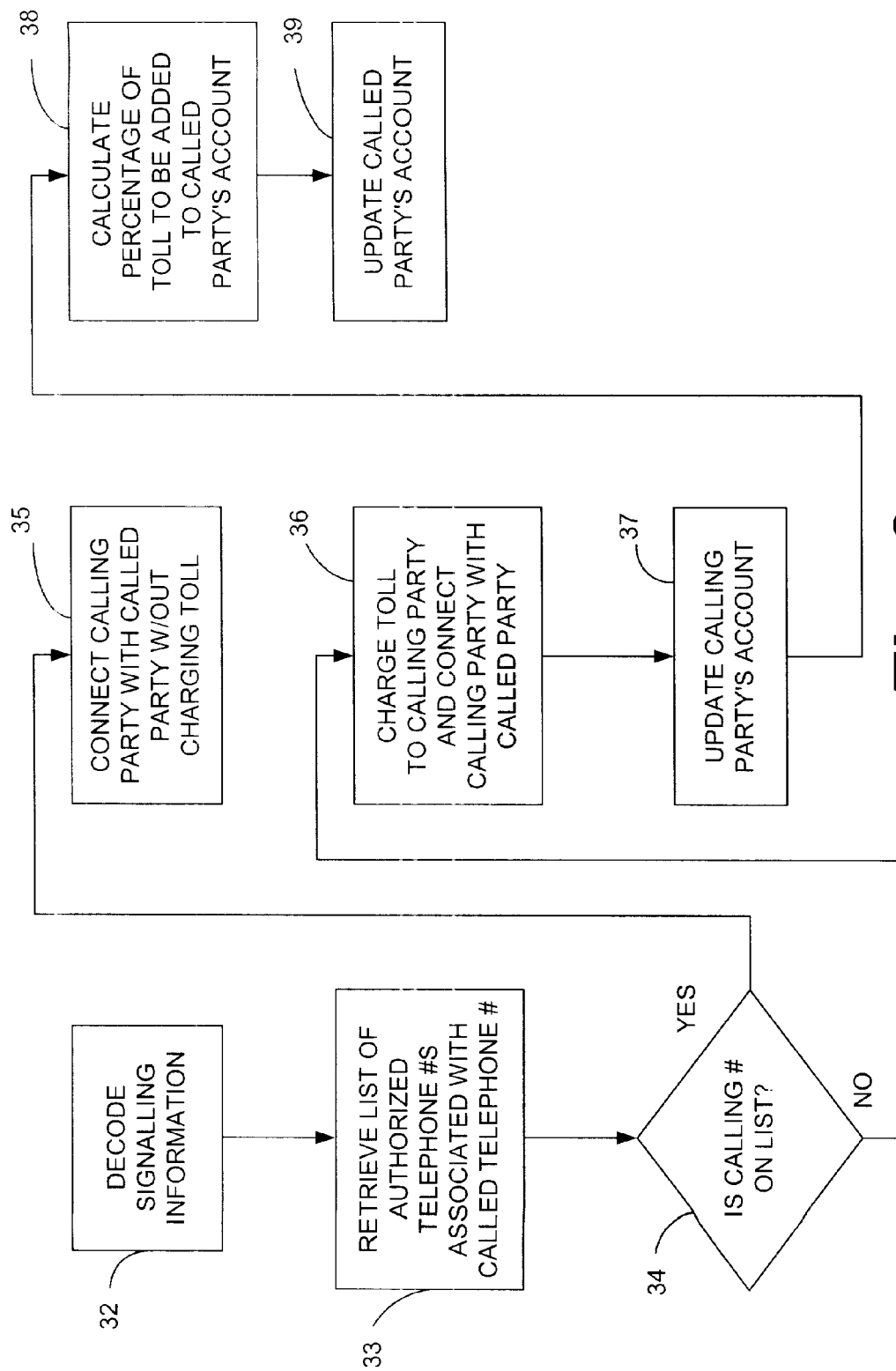
FIG. 3 is a flow chart functionally demonstrating the method of the present invention in accordance with a first embodiment.

This method of the present invention is shown in detail in FIG. 3 in accordance with a first embodiment. When a calling party initiates a telephone call, the call signaling information is decoded in the manner discussed above, as indicated at block 32. It will be understood by those skilled in the art that the method and apparatus of the present invention apply to all types of communications devices which utilize the telephone network including, but not limited to, for example, analog telephones, digital telephones, cordless telephones, hand-held devices, facsimile machines, pagers, cellular telephones, etc. It will be understood by those skilled in the art the manner in which the method and apparatus of the present invention apply to all such devices.

The information decoded at block 32 will include both the calling party's telephone number, as well as the subscriber's telephone number. This information may also contain the identity of the calling party. Preferably, the subscriber's telephone number is used to generate a memory address, or a block of addresses, at which the subscriber's list of authorized calling parties is stored. The computer of the switching module 20 then compares the calling party's telephone number with the telephone numbers contained in the list, as indicated at blocks 33 and 34 and makes a determination as to whether the calling party's telephone number is contained on the list of authorized calling parties.

If so, the calling party is connected to the subscriber by the switching module without a fee being charged to the calling party's account, as indicated at block 35. If not, the calling party is charged a fee and the calling party is connected with the subscriber, as indicated at block 36. The calling party's billing account is then updated, as indicated at block 37. The administrative module 18 then calculates the percentage of the collected fee to be added to the subscriber's account, as indicated at block 38. The administrative module then updates the subscriber's billing account, as indicated at block 39. It will be understood by those skilled in the art that the order in which steps 35 through 39 are performed is not critical to the present invention. For example, the operations occurring at block 37 may be performed prior to the calling party actually being connected to the subscriber. Similarly, the subscriber's account could be updated before the calling party's account is updated. Also, other determinations may also be made, such as, for example, whether the calling party's billing account is current, i.e., whether or not the calling party has been delinquent in paying its telephone bill or its toll fee bill.

Figure 4:
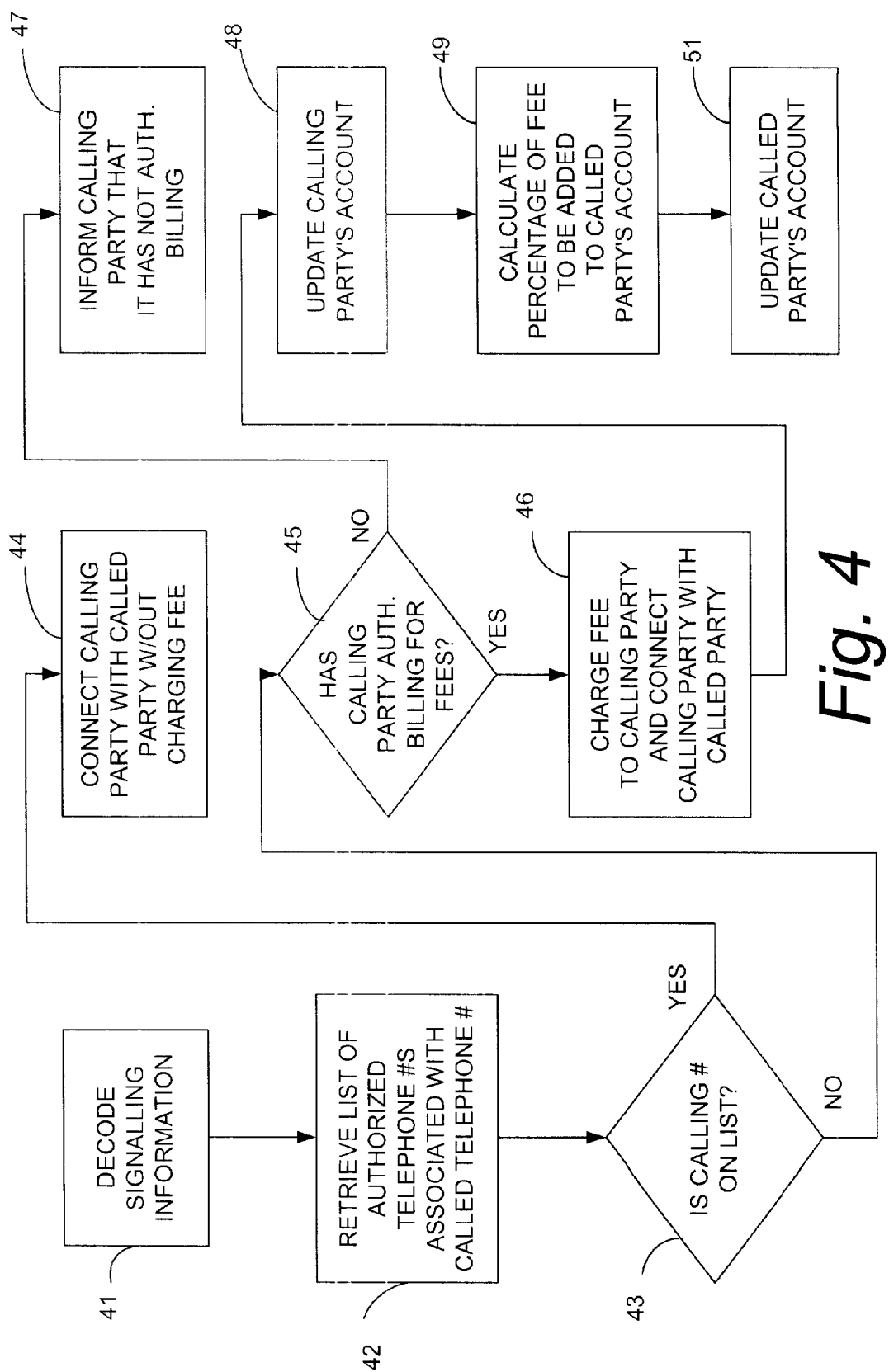
FIG. 4 is a flow chart functionally demonstrating the method of the present invention in accordance with a second embodiment.

FIG. 4 illustrates an alternative embodiment of the present invention which is similar to the embodiment shown in FIG. 3 except that, prior to billing the fee to the calling party's account, a determination is made as to whether the calling party has authorized these types of fees to be billed to its account, as indicated at step 45. This feature of the present invention is intended to prevent calling parties from being billed without their knowledge or consent. A determination is made at step 43 as to whether the calling party is on the list of authorized calling parties. If so, the calling party is connected with the subscriber without the fee being charged, as indicated at block 44. If the calling party is not on the list of authorized calling parties, a determination is made as to whether the calling party has authorized billings for these types of fees to be charged to its account, as indicated at block 45. If not, the calling party is informed that it has not authorized these types of billings, as indicated at block 47.

If the calling party has authorized such billings, the fee is charged to the calling party's billing account and the calling party is connected with the subscriber, as indicated at block 46. The calling party's billing account is then updated, as indicated at block 48. The percentage of the fee to be added to the subscriber's account is then calculated, as indicated at block 49, and the subscriber's billing account is updated, as indicated at block 51. Whatever percentage of the fee that is not added to the subscriber's account may be retained by the telephone company or may be paid to some other entity. However, as indicated above, the manner in which the fee is allocated is not critical to the present invention.

It should also be noted that the methods of the present invention described above can also be used with facsimile machines since these also make use of the telephone network and since the telephone number of the calling facsimile machine is contained in the common-channel signaling information. In this case, the steps performed in FIGS. 3 and 4 will also be performed for facsimile communications using the telephone number of the facsimile initiating the communication.

Figure 5:
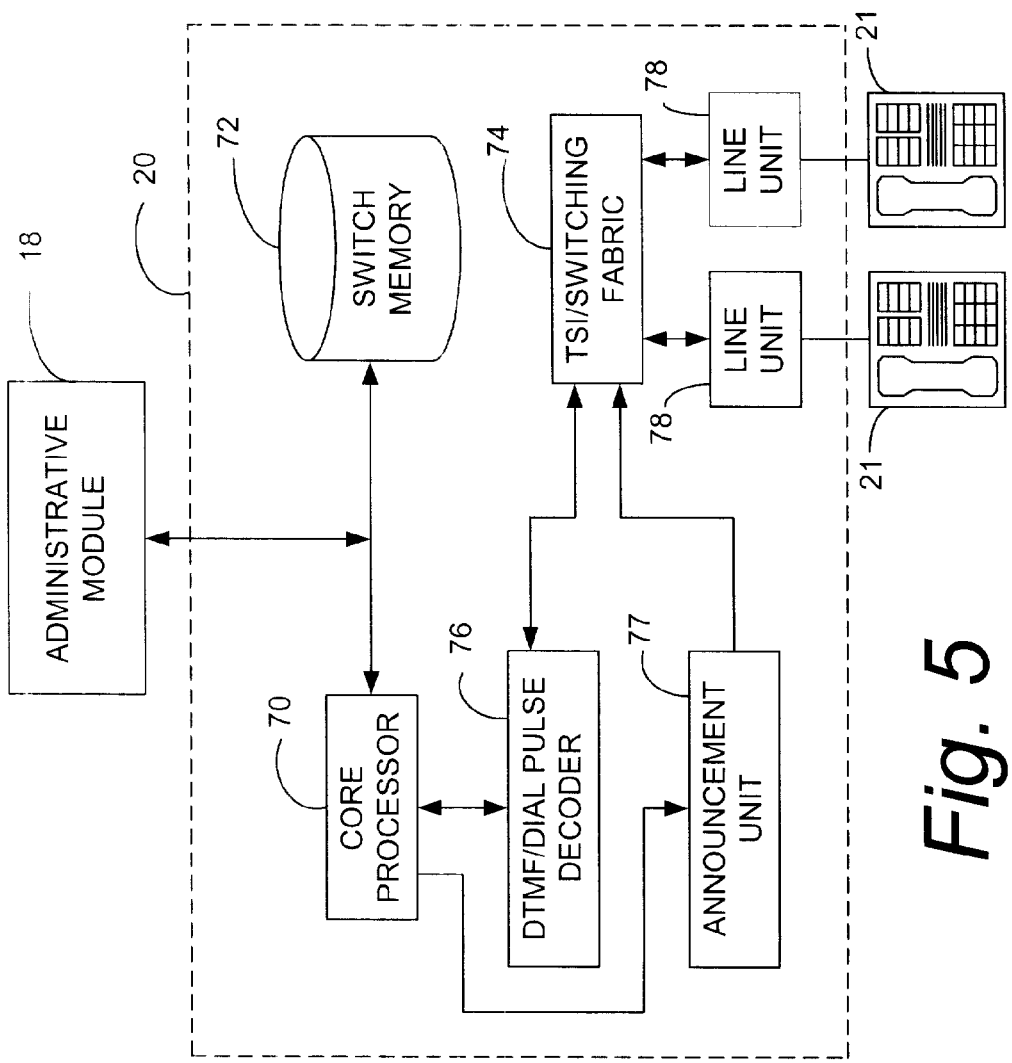
FIG. 5 is a block diagram of the switching module shown in FIG. 2.

FIG. 5 is a block diagram illustrating the components of the switching module 20 shown in FIG. 2. The switching module comprises line units 78 which comprise circuitry (not shown) which terminates the telephone lines connected to the telephones 21. A time slot interchanger (TSI) 74, also commonly referred to as the switching fabric, controls the multiplexing and demultiplexing of the telephones 21 communicating with the switching module 20. The TSI 74 is in communication with a dual tone multifrequency (DTMF)/dial pulse decoder 76 which decodes the frequencies entered on the keypads of the telephones 21. The DTMF 76 then provides digit reports corresponding to the decoded frequencies to a core processor 70 of the switching module 20. The core processor receives the digit reports and determines whether a call is to be routed or whether a feature is to be activated. The core processor 70 runs software and other data stored in switch memory device 72. In accordance with the present invention, the core processor 70 generates the subscriber authorization lists and updates, or modifies, the authorization lists, which preferably are stored in switch memory device 72. The core processor 70 also performs the tasks of determining whether a caller is an authorized or unauthorized caller, as discussed above with respect to FIGS. 3 and 4.

As stated above, the authorization list may be generated in a plurality of manners. In accordance with a first embodiment of the present invention, the subscriber may simply call the local telephone company and orally provide the local telephone company with a list of authorized callers. Preferably, the list is maintained by the subscriber's local telephone company because the method and apparatus of the present invention are preferably implemented at the central office, which is typically owned and operated by the local telephone companies. However, those skilled in the art will understand that the present invention is not limited with respect to the location in the telephone network at which the present invention is implemented and thus is not limited with respect to the entity which maintains the authorization list. For example, the authorization list could be maintained by a long distance carrier.

In accordance with the first embodiment of the present invention, whenever the list is to be updated, i.e., whenever a telephone number is to be removed or added to the list, the subscriber simply calls the local telephone company (or other entity maintaining the list) and orally updates the list. A person at the local telephone company edits the list on a computer in accordance with the subscriber's requests and the modified list is then saved in switch memory device 72. Also, if a caller was charged in return for being connected to the subscriber and the subscriber now wants to add the caller to the authorization list and/or delete the charge, the subscriber can orally request that the caller be added to the fist and/or that the charge to the caller be deleted. Once the modifications to the list have been made, the list with the updates is re-saved in the switch memory device 72. The charges associated with any unauthorized calls are also saved in one or more files in the switch memory device 72 and these files are eventually downloaded to the administrative module 18 so that appropriate billing records can be updated and/or generated.

Figure 6:
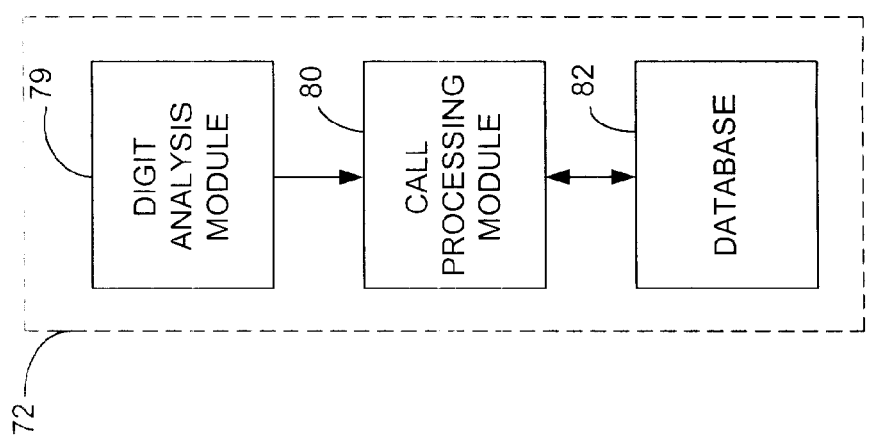
FIG. 6 is a block diagram of the software and data stored in the switch memory of the switching module shown in FIG. 5.

FIG. 6 is a block diagram illustrating the software modules and the database stored in switch memory device 72 which are utilized by the core processor 70 to generate and update the subscriber authorization lists. The core processor 70 runs a digit analysis software module 79 which analyzes the digit reports received by the core processor 70 from the DTMF decoder 76 to identify the digits that have been pressed or dialed. Information relating to the identified digits is then utilized by a call processing software module 80 executed by the core processor 70. The call processing software module 80 determines whether the digits represent a call to be routed or whether they represent a feature to be activated. In accordance with the present invention, the feature to be activated is a request to generate or update a subscriber authorization list.

Figure 7:
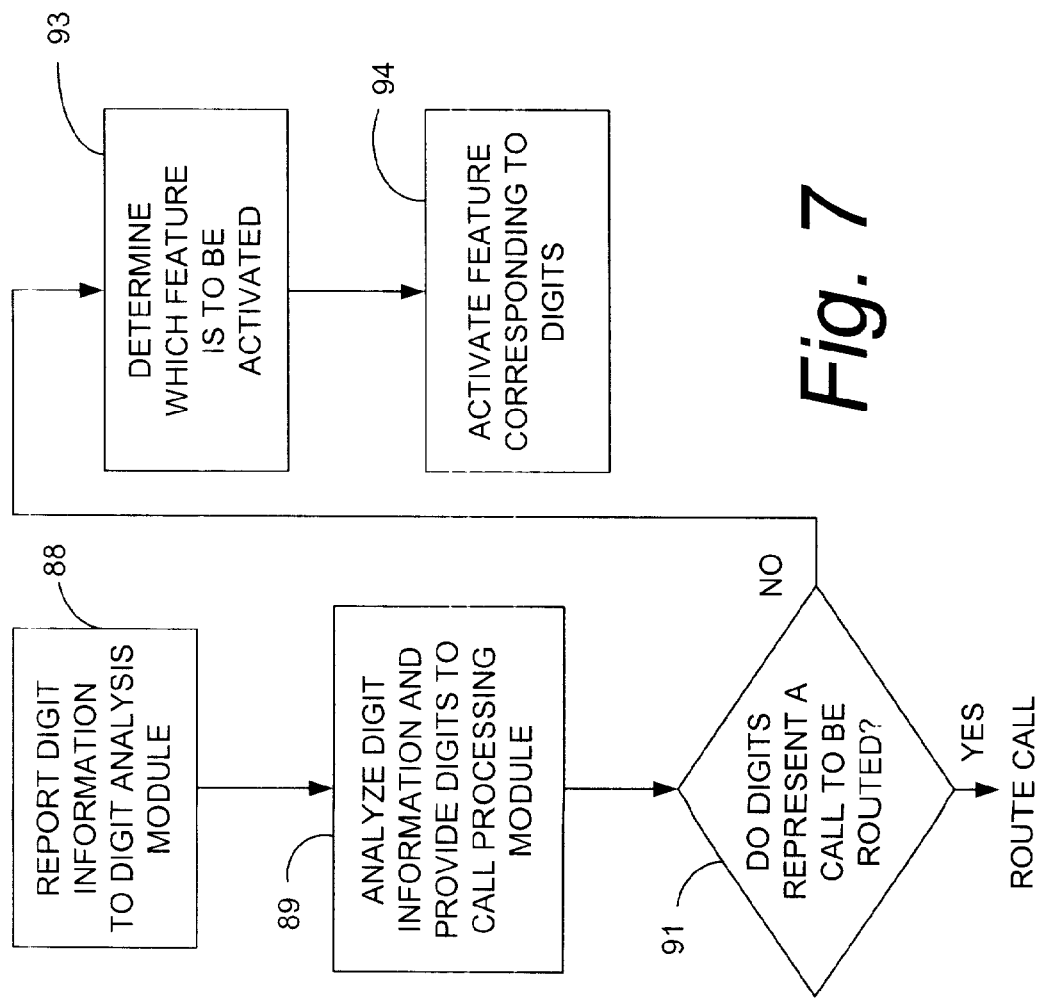
FIG. 7 is a flow chart showing the process performed by the switching module of FIG. 5 in determining whether a feature is to be activated or whether a call is to be routed.

FIG. 7 is a flow chart functionally illustrating the operations performed by the DTMF decoder 76 and by the core processor 70 executing the digit analysis and call processing software modules 79 and 80, respectively. As stated above, the DTMF decoder 76 generates digit reports which are output to the core processor 70, as indicated by block 88. The digit analysis software module 79 being executed by the core processor 70 then analyzes the digit reports to determine which digits were entered by the subscriber and this information is passed to the call processing module 80, as indicated by block 89. The call processing module 80 then determines whether a call is to be routed or whether a feature is to be activated, as indicated by block 91. If a call is to be routed, the core processor 70 sets up the path for the call. If a feature is to be activated, the call processing module determines which feature is to be activated, as indicated by block 93, and then causes the selected feature to be activated, as indicated by block 94.

Figure 8:
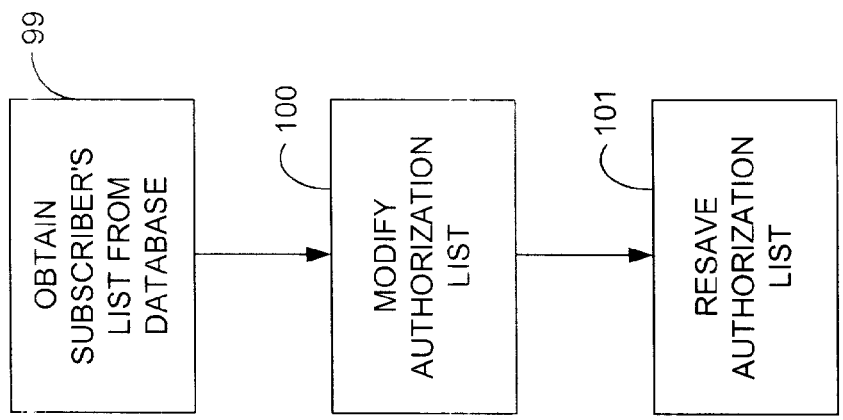
FIG. 8 is a flow chart illustrating the method of the present invention for modifying an existing authorization list in accordance with the present invention.

When the call processing software module 80 determines at block 93 that the digits correspond to a request to update a subscriber authorization list, the call processing module 80 retrieves the list associated with the subscriber from the database 82 stored in the switch memory device 72, as indicated by block 99 in FIG. 8. The core processor 70 then modifies the file corresponding to the subscriber's authorization list in accordance with the digit reports received by the core processor 70 from the DTMF decoder 76, as indicated by block 100. These digit reports correspond to entries made by the subscriber on his or her telephone 21 which, in turn, correspond to telephone numbers to be added to or deleted from the list. Once the list has been modified, the list is re-saved in the database 82 contained in the switch memory device 72, as indicated by block 101.

The same code or different codes can be assigned to the tasks of updating an existing list and of generating a new list. For example, the code "*62" could be assigned to the task of generating a new list and the code "*63" could be assigned to the task of updating an existing list. If different codes are used for these tasks, the core processor 70 will simply perform as instructed by the software of the call processing software module in accordance with the code received from the DTMF decoder 76. In this case, the routines executed by the core processor 70 will vary depending on which code was received.

If the same code is used for both of these tasks, the core processor 70 will cause a prerecorded announcement to be played back by the announcement unit 77 to the subscriber that tells the subscriber to enter a particular digit if the subscriber wants to update an existing list and to enter a different digit if the subscriber wants to create a new list. The announcement unit 77 may be comprised in what is commonly referred to as a global digital service unit (not shown) which contains a variety of prerecorded announcements that serve subscribers. In this case, the recorded announcement might state, for example: "If you wish to update an existing list, press 1. If you wish to create a new list, press 2".

In this example, if a 1 was entered by the subscriber, the next recorded announcement might state: "If you wish to add a new number to your list, please press 1. If you wish to delete a number from your list, please press 2." In this example, if a 1 was entered by the subscriber in response to this announcement, the next announcement might state: "Please enter each number to be added to your list, starting with the area code. After each number has been entered, press the star key. Once you have completed entering all of the numbers, press the pound key, or simply hang up."

If the subscriber is generating a new list, the core processor 70 may cause similar announcements might be played back to the subscriber by the announcement unit 77 to assist the subscriber in creating the list. Those skilled in the art will understand the manner in which this task and the announcements, if any, can be customized to facilitate the tasks of creating new lists or modifying old lists. It should also be noted that announcements are not necessary at all. The subscriber who has subscribed to the service of the present invention may be provided with instruction literature which obviates the need for recorded announcements. However, preferably announcements are used to facilitate this process and to make the process of updating and creating lists easy for the subscriber.

FIG. 8 is a flow chart generally illustrating the method of the present invention in accordance with one embodiment which enables a subscriber to create a new subscriber authorization list. When the subscriber picks up the telephone to get a dial tone, the subscriber enters a code which the core processor 70 recognizes as a request to update a subscriber authorization list. The core processor 70 then causes a prerecorded announcement to be played back to the subscriber which tells the subscriber how to enter the information to be placed in the authorization list, as indicated by block 105. The announcement might say, for example: "Enter each telephone number to be placed in your list, starting with the area code. After each telephone number has been entered, press the star key. Once you have finished entering all of the telephone numbers, press the pound key. You may start entering the telephone numbers to be placed in your list now."

In this example, the call processing module 80 being executed by the core processor 70 will control the generation of the list, as indicated by block 107, and, at the same time, will wait for the pound key to be pressed, as indicated by block 106. Once the pound key has been depressed, the core processor 70 will save the new list along with an indication of the subscriber (e.g., his or her telephone number) with which the list is associated, as indicated by block 108.

One important feature of the present invention is that the subscriber is provided with a way to prevent callers who are not currently listed on the subscriber's authorization list from being charged a fee in return for being connected to the subscriber's telephone. Preferably, immediately after the subscriber has finished speaking or otherwise communicating with the unauthorized caller that the subscriber wishes to add to the list, the subscriber hangs up the telephone, thereby causing it to go "on-hook", and then immediately picks up the telephone, thereby causing it to go "off-hook". The subscriber then enters a particular code, such as, for example, "*71", which preferably is different from the code(s) assigned to the tasks of updating and generating authorization lists. This code indicates to the core processor 70 that the last caller that was connected with the subscriber is to be added to the subscriber's authorization list and/or that the fee that was charged to the caller is to be deleted from the billing records.

Figure 10:
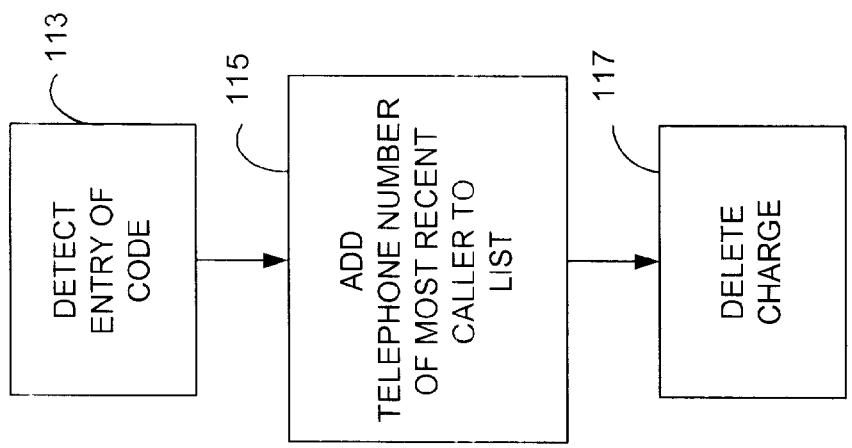
FIG. 10 is a flow chart illustrating the method of the present invention for allowing the subscriber to automatically add the telephone number of the most recent unauthorized calling party to the subscriber's authorization list and/or which allows the fee that was charged to the caller to be deleted from the billing records.
Figure 9:
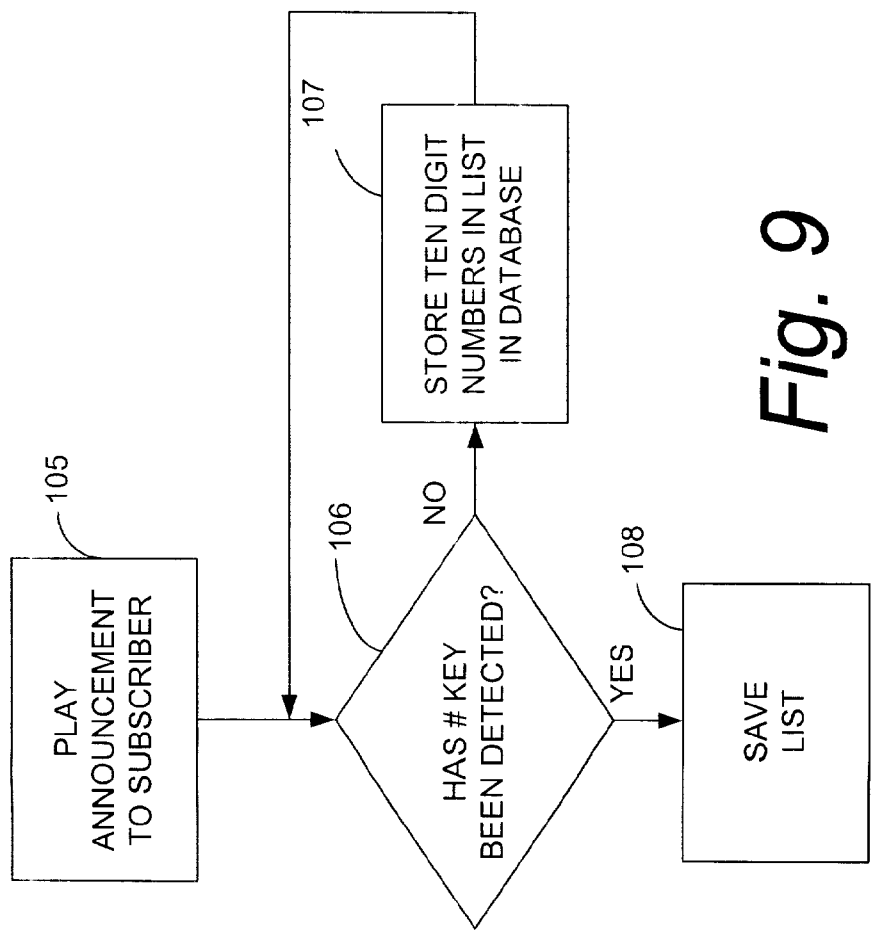
FIG. 9 is a flow chart illustrating the method of the present invention in accordance with one embodiment for creating a new subscriber authorization list.

Currently, typical switching modules keep track of the last call that was connected to the subscriber's line. The well known "call back" feature provided by telephone companies uses this information. Also, when a telephone goes "off-hook", typical switching modules know the telephone number associated with the telephone that is "off-hook". Therefore, all the subscriber has to do in order for the last caller to be added to the list and/or for the charge to be removed is to enter this code, which preferably is common to all subscribers who subscribe to the feature of the present invention. An exemplary embodiment of this feature of the present invention is shown in FIG. 10. When the subscriber finishes speaking with someone whom the subscriber wants to have added to the list, the subscriber will simply hang up the telephone, wait to hear the dial tone, and then press the code, e.g., "*71". The call processing software module 80 being executed by the core processor 70 detects the entry of the code "*71", as indicated by block 113, and then causes the last caller's telephone number to be added to the subscriber's list, as indicated by block 115. This may also cause the charge to the caller to be removed from the billing file stored in the switch memory device, as indicated by block 117. This feature of the present invention allows the subscriber to easily update the list and to easily delete charges to callers whom the subscriber does not want to be charged.

It should be noted that the same or different codes can be assigned to the tasks of adding the last caller to the list and of modifying the file containing fee information in order to delete the charge to the last caller. If the same code is used for these tasks, then a prerecorded announcement might be played to the subscriber when the core processor detects the code which states: "If you would like to add the caller to your list and you would like to have the fees charged to the caller removed, press 1. If you would like to have the fees charged to the caller removed, but do not wish to have the caller added to your list, press 2. If you would like to have the caller added to your list, but do not wish to have the fee removed, please press 0."

Due to the high volume of traffic that may result from playing back announcements to subscribers and from the keypad entries made by the subscribers in response to the announcements, it may be desirable to utilize a trunk unit (not shown) which connects the switching module 20 to one or more processors (not shown) that are dedicated to controlling the playback of the prerecorded announcements by one or more announcement units to the subscribers, as well as the handling of the keypad entries made by the subscribers. These additional processors may use the decoder 76 of the switching module to decode the entries made by the subscribers in response to the announcements, or they may use one or more separate decoders (not shown) which are dedicated to this task. Those skilled in the art will understand the manner in which this additional equipment could be implemented in accordance with the present invention to handle these tasks.

It should be noted that the present invention has been described with respect to particular embodiments, but that the present invention is not limited to these embodiments. It will also be understood by those skilled in the art that the manner in which an unauthorized calling party is billed with a fee and the manner in which the billing account of the calling or receiving party is updated is not limited to any particular method. Also, the location at which the billing of the fee and the updating of any accounts is performed is not limited to any particular location. This preferably is performed at the central office connected to the customer premises, but may also be performed at some location in the telephone network which is in communication with the customer premises. It will be understood by those skilled in the art that other modifications and variations to the embodiments of the present invention discussed above can be made which are in the scope and spirit of the present invention.

What is claimed is:

1. An apparatus for updating an authorization list file, the authorization list file corresponding to a list of calling parties whom a subscriber associated with the authorization list file desires to receive telephone calls from, wherein the apparatus is in communication with a telephone network, the apparatus comprising:

a decoder in communication with the telephone network, the decoder receiving tones corresponding to entries made on a telephone keypad by the subscriber and decoding the tones to produce digit information;

a computer in communication with the decoder, wherein the digit information produced by the decoder is provided to the computer, and wherein the computer analyzes the digit information to identify the entries that were made on the telephone keypad, wherein at least one of the entries corresponds to telephone numbers entered by the subscriber, the telephone numbers entered by the subscriber corresponding to calling parties whom the subscriber desires to receive telephone calls from, and wherein the digit information produced by the decoder and provided to the computer corresponds to a code which is interpreted by the computer, wherein the code corresponds to a request by the subscriber to add a telephone number of a most recent calling party to the subscriber's authorization list file, and wherein once the computer has interpreted the code and has determined that the code corresponds to said request, the computer saves the telephone number of the most recent calling party in the subscriber's authorization list file in the memory device and causes a fee that was to be charged to the most recent calling party to be deleted from a billing file; and a memory device in communication with the computer, and wherein the computer causes the telephone numbers entered by the subscriber to be saved in an authorization list file in the memory device, and wherein the computer saves a subscriber indication in the memory device that associates the subscriber's telephone number with the subscriber's authorization list file.

2. The apparatus of claim 1, wherein the computer is a processor located in a switching module comprised at a central office which is in communication with the telephone network.

3. A method for updating an authorization list file stored in a memory device, the authorization list file corresponding to a list of calling parties whom a subscriber associated with the authorization list file desires to receive telephone calls from, the method comprising the steps of:

decoding tones received by a decoder to produce digit information, the decoder being in communication with a telephone network, the tones corresponding to entries made on a telephone keypad by the subscriber;

analyzing the digit information in a computer to identify the entries that were made on the telephone keypad, wherein at least one of the entries corresponds to a code indicating that the telephone number of a most recent calling party is to be added to the authorization list file;

saving the telephone number of the most recent calling party in the authorization list file in the memory device; and deleting a fee that was to be charged to the most recent calling party.

4. The method of claim 3, wherein the computer is a processor located in a switching module comprised at a central office in communication with the telephone network.

* * * * *